United States Patent
Hoeger

(10) Patent No.: US 11,389,890 B2
(45) Date of Patent: Jul. 19, 2022

(54) VACUUM INSULATED WELDING TORCH

(71) Applicant: ILLINOIS TOOL WORKS INC., Glenview, IL (US)

(72) Inventor: Michael Vincent Hoeger, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 615 days.

(21) Appl. No.: 14/543,518

(22) Filed: Nov. 17, 2014

(65) Prior Publication Data

US 2016/0136750 A1 May 19, 2016

(51) Int. Cl.

| | |
|---|---|
| *B23K 9/32* | (2006.01) |
| *B23K 9/14* | (2006.01) |
| *B23K 9/29* | (2006.01) |
| *B23K 35/02* | (2006.01) |
| *B23K 35/22* | (2006.01) |
| *B23K 9/28* | (2006.01) |

(52) U.S. Cl.
CPC .................. *B23K 9/32* (2013.01); *B23K 9/14* (2013.01); *B23K 9/296* (2013.01); *B23K 9/323* (2013.01); *B23K 35/0222* (2013.01); *B23K 35/0255* (2013.01); *B23K 9/28* (2013.01); *B23K 9/321* (2013.01); *B23K 35/222* (2013.01)

(58) Field of Classification Search
CPC . B23K 9/14; B23K 9/32; B23K 9/296; B23K 1/008; B23K 35/0222; B23K 35/0255
USPC .............. 219/137.2, 137.31, 137.61, 137.62, 219/137.63
See application file for complete search history.

(56) References Cited

U.S. PATENT DOCUMENTS

| | | | | |
|---|---|---|---|---|
| 4,313,046 A | | 1/1982 | Henry | |
| 4,393,298 A | * | 7/1983 | Frantzreb, Sr. ........ | B23K 9/285 219/137.42 |
| 4,575,612 A | * | 3/1986 | Prunier .................. | B23K 9/123 219/137.43 |
| 4,788,401 A | * | 11/1988 | Kleppen ............... | B23K 9/296 219/137.42 |
| 5,403,987 A | * | 4/1995 | Rehrig ................... | B23K 9/296 219/137.51 |
| 5,573,532 A | * | 11/1996 | Chang .................... | A61B 18/02 228/221 |
| 5,791,551 A | * | 8/1998 | Parks ................... | B23K 1/0008 228/184 |

(Continued)

FOREIGN PATENT DOCUMENTS

| | | |
|---|---|---|
| CN | 1125434 | 6/1996 |
| CN | 1826203 | 8/2006 |

(Continued)

OTHER PUBLICATIONS

International Search Report from PCT application No. PCT/US2015/055036, dated Feb. 9, 2016, 12 pgs.

*Primary Examiner* — Justin C Dodson
(74) *Attorney, Agent, or Firm* — McAndrews, Held & Malloy, Ltd.

(57) ABSTRACT

Embodiments of a welding torch with an improved handle are provided. The welding torch may include an electrical conductor, an outer material layer disposed about the electrical conductor, and a sealed vacuum region disposed between the electrical conductor and the outer material layer.

14 Claims, 4 Drawing Sheets

(56) References Cited

U.S. PATENT DOCUMENTS

| | | | | |
|---|---|---|---|---|
| 5,910,104 | A * | 6/1999 | Dobak, III | A61B 18/02 |
| | | | | 600/121 |
| 5,998,760 | A * | 12/1999 | Kunz | B23K 9/295 |
| | | | | 219/137.31 |
| 6,720,528 | B1 * | 4/2004 | Matiash | B23K 9/323 |
| | | | | 219/137.31 |
| 2005/0016966 | A1 * | 1/2005 | Delgado | B23K 9/167 |
| | | | | 219/75 |
| 2006/0054609 | A1 * | 3/2006 | Matthews | B23K 9/1043 |
| | | | | 219/130.4 |
| 2006/0237411 | A1 * | 10/2006 | Mendez | B23K 9/173 |
| | | | | 219/137 R |
| 2006/0237441 | A1 * | 10/2006 | Fujimura | H05B 3/44 |
| | | | | 219/531 |
| 2009/0277892 | A1 * | 11/2009 | Achtner | B23K 9/285 |
| | | | | 219/137.62 |
| 2011/0264084 | A1 * | 10/2011 | Reid | A61B 18/02 |
| | | | | 606/23 |
| 2012/0152927 | A1 * | 6/2012 | Hung | B23K 9/167 |
| | | | | 219/137.62 |

FOREIGN PATENT DOCUMENTS

| | | |
|---|---|---|
| EP | 1087854 | 4/2001 |
| WO | 2012082836 | 6/2012 |
| WO | 2014019958 | 2/2014 |

\* cited by examiner

VACUUM INSULATED WELDING TORCH

BACKGROUND

The present disclosure relates generally to welding systems and, more particularly, to a welding torch with a vacuum insulated handle.

Welding systems generally include an electrode configured to pass an arc between a torch and a work piece, thereby heating the work piece to create a weld. In many systems, such as metal inert gas (MIG) welding and stick welding systems, the electrode is a consumable wire that melts into the weld to provide a filler material into the weld. In contrast, TIG welding systems employ a non-consumable tungsten electrode that is independent from the filler material. That is, the TIG welding process does not melt the tungsten electrode into the weld forming on the work piece, and the tungsten electrode heats up over a period of use.

In certain welding systems, and air boundary or air circulating around the welding torch handle typically prevents the handle from overheating throughout welding operations. However, certain welding applications may generate more heat than natural or forced convection (e.g., air boundary or circulated ambient air) is able to dissipate, and such applications are generally accomplished using liquid cooled torches. Liquid cooled torches may include a number of additional components, such as conduits for conveying liquid to and from a liquid cooling system, which can add bulk to the welding torch, making the torch difficult to maneuver in certain locations. In addition, maneuverability of welding torches may be cumbersome and/or limited due to the size and bulk of the welding torches. Therefore, there exists a need for a welding torch of reduced size and an enhanced thermal boundary to reduce overheating of the welding torch, while improving maneuverability and ergonomics of the welding torch.

BRIEF DESCRIPTION

In one embodiment, a welding torch includes an electrical conductor, an outer material layer disposed about the electrical conductor, and a sealed vacuum region disposed between the electrical conductor and the outer material layer.

In another embodiment, a method includes providing a welding torch electrical conductor, positioning an outer material layer about the welding torch electrical conductor, creating a vacuum region between the outer material layer and the welding torch electrical conductor, and securing the outer material layer about the welding torch electrical conductor to seal the vacuum region.

In a further embodiment, a welding torch includes a welding torch handle having a welding torch electrical conductor, an outer material layer disposed about the welding torch electrical conductor, a sealed vacuum region disposed between the welding torch electrical conductor and the outer material layer, and an overmolded outer layer disposed about the outer material layer.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Present embodiments are directed toward a welding torch having a vacuum insulated handle. For example, a welding torch may include an electrical conductor through which a welding current may flow, a sealed vacuum region about the conductor, and an outer material layer disposed about the vacuum sealed region. The sealed vacuum region may function or operate as an insulating region about the conductor, thereby reducing heat transfer from the conductor to the outer material layer, and ultimately to an operator's hand or equipment holding the welding torch, during a welding operation. As will be appreciated, the inclusion of a sealed vacuum region about the conductor may enable a reduction in the size and/or bulk of other insulating material layers disposed about the conductor, while still achieving a desired reduction in heat transfer from the conductor to an exterior of the welding torch. As discussed in detail below, the sealed vacuum region of the welding torch may be created using a variety of methods or processes, such as a vacuum brazing technique.

Figure 1:
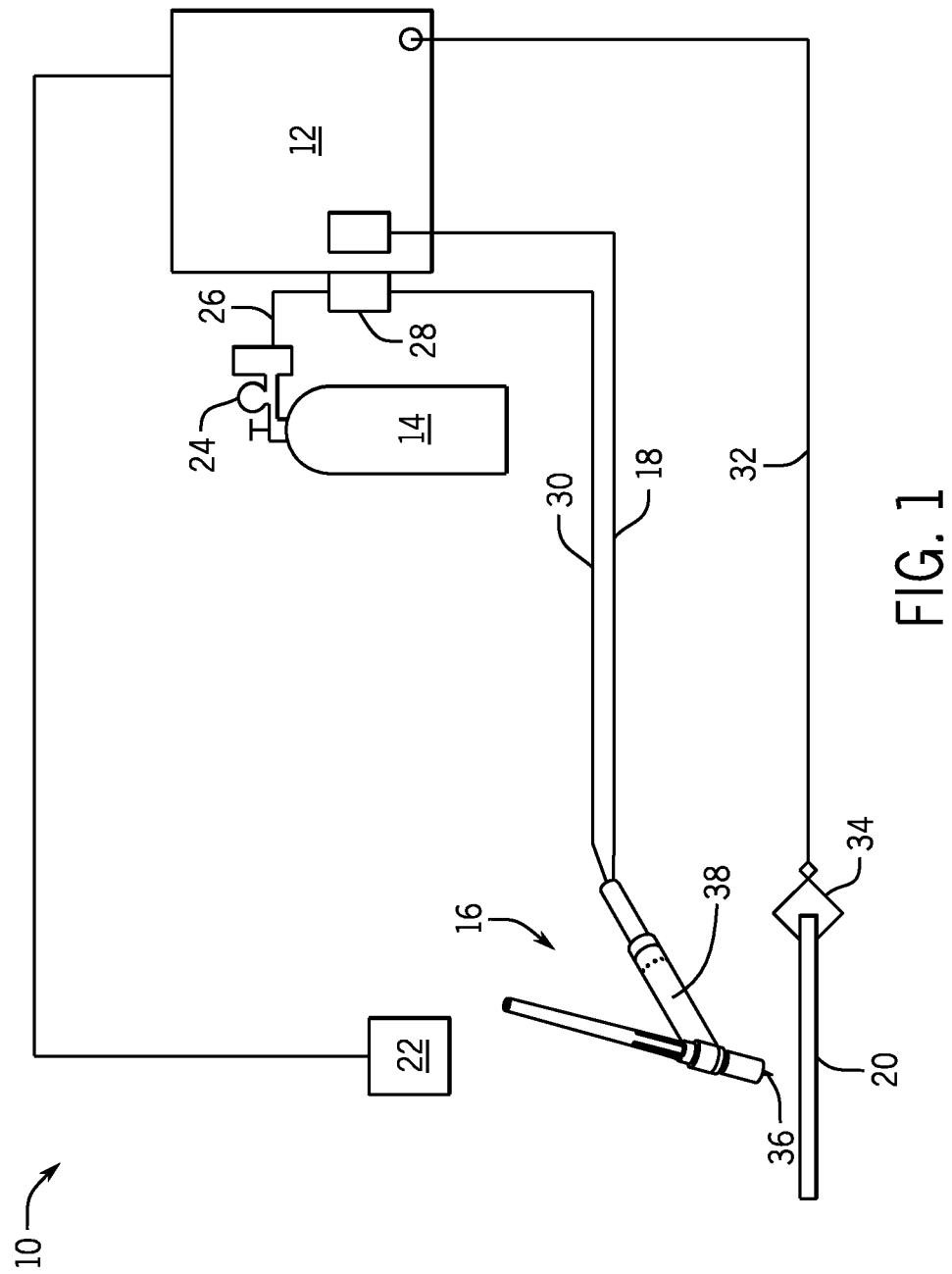
FIG. 1 is a schematic view of an exemplary welding system in accordance with embodiments of the present invention.

Turning now to the figures, FIG. 1 illustrates a welding system 10 (e.g., a tungsten inert gas (TIG) welding system) including a power source 12, a shielding gas source 14, and a torch 16. In the illustrated embodiment, the power source 12 provides power to the welding torch 16 via a power supply conduit 18. The power source 12 may supply a direct current (DC) or alternating current (AC) to the torch 16 depending on the desired application. For example, an AC current may be suited for welding aluminum or magnesium, and a DC current may be suited for welding stainless steels, nickel or titanium. In addition to matching the current to the material selection, the output of the power source 12 may be varied to obtain desired weld characteristics. For example, a low AC frequency (e.g., 56 Hz) current may generate a wide arc with shallow penetration of a work piece 20, while a high AC frequency (e.g., 200 Hz) current may generate a focused arc with deeper penetration into the work piece 20.

In addition to the frequency of the current, the power source 12 may vary the amperage of the current output to the torch 16. The setting for the amperage output by the power source 12 may be adjusted by a setting a knob or button or other input device on the power source 12, or may be set by a remote control 22. For example, a welding system 10 may include a foot pedal remote control 22 (as illustrated) that allows the operator to make current adjustments during welding by either holding down the foot pedal or feathering the foot pedal remote control 22 to vary the amperage. The remote control 22 may also include a finger tip control, audible command, or other form of input to signal the power source 12 to output a corresponding current.

In addition, the torch 16 may be supplied with a shielding gas from a gas source 14. In general, the shielding gas may be supplied to the torch 16 and expelled from the torch at the location of the weld. The shielding gas may be expelled immediately prior to striking the welding arc, throughout welding, and/or until shortly after the welding arc is extinguished. The shielding gas protects the welding area from atmospheric gases such as nitrogen and oxygen, which can cause fusion defects, porosity, and weld metal embrittlement. The shielding gas may also transfer heat from the welding electrical conductor to the metal and may help to start and maintain a stable arc.

As depicted in FIG. 1, the shielding gas may be provided in a container and delivered to the torch 16 via a regulator 24, a conduit 26, a gas valve 28, and a gas conduit 30. The regulator 24 may allow an operator to limit the pressure of the gas delivered to the gas valve 28 to obtain a desired flow rate. Further, the gas valve 28 may provide for stopping and starting the flow of the shielding gas to the torch 16 in coordination with other welding operations. Although shown mounted on the power source 12, the gas valve 28 may be located at other positions within the welding system 10, e.g., on the torch 16.

In general, the welding system 10 may provide for current flow via a work piece 20 to the power source 12. For example, as depicted in FIG. 1, the welding system 10 may include a cable 32 that is secured to the work piece 20 via a work clamp 34. In this configuration, the current provided by the power source 12 flows through the supply conduit 18 to the torch 16, flows across an arc from an electrical conductor 36 to the work piece 20, and returns to the power source 12 via the work clamp 34 and the cable 32.

Present embodiments of the torch 16 may include a vacuum insulated handle 38. For example, the vacuum insulated torch handle 38 may include a vacuum region disposed between the electrical conductor 36 of the torch 16 and an outer material layer formed around the vacuum region. In certain embodiments, the vacuum region may be formed using a method such as vacuum brazing. The outer material layer may be formed of any suitable heat-resistant material, such as a ceramic, polymer, plastic, or other material. Furthermore, certain embodiments of the vacuum insulated handle 38 may include an additional overmolded layer disposed about the outer material layer. For example, the additional overmolded layer may be formed from rubber or other suitable material. These and other features of the vacuum insulated torch handle 38 will be described in further detail with respect to FIG. 2.

Figure 2:
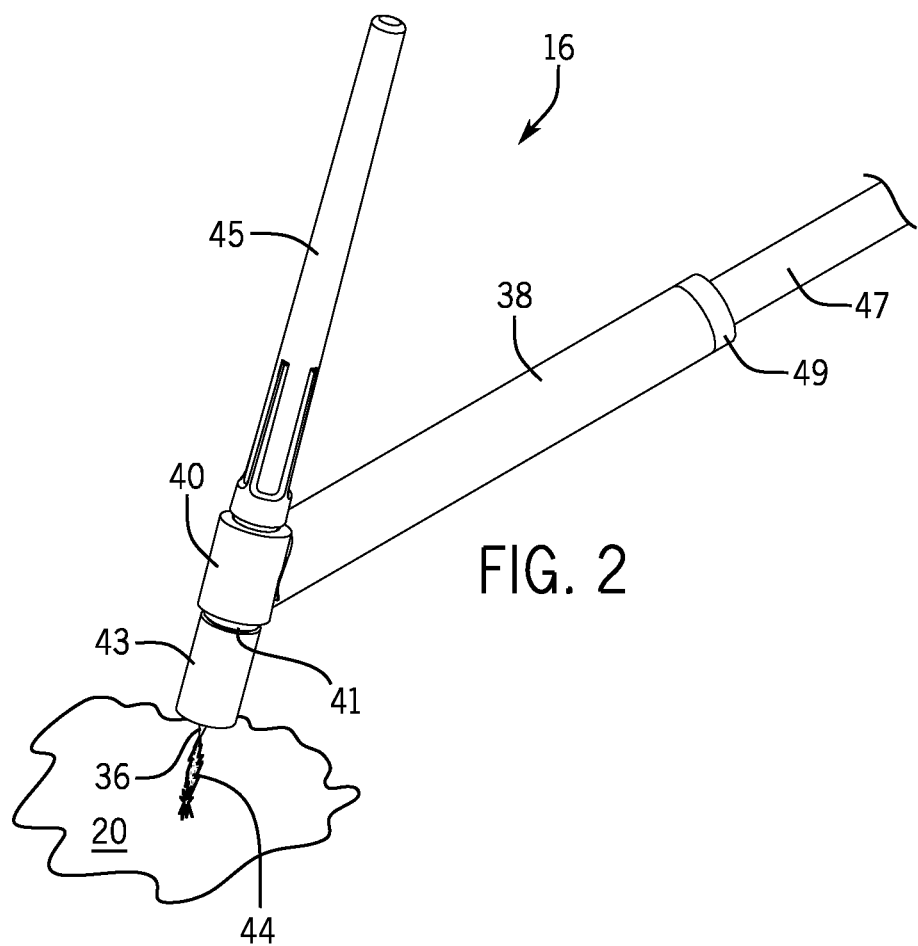
FIG. 2 is a perspective view of a welding torch having a vacuum insulated handle.

FIG. 2 is a perspective view of the torch 16, including the vacuum insulated torch handle 38. The torch head 40 may be a component of a larger torch body which extends into the handle 38, allowing an operator to hold and manipulate the welding torch 16 via the handle 38. The electrical conductor 36 is used to facilitate the creation of a welding arc 44 between the torch 16 and the work piece 20 for a welding operation. As described in detail below, the handle 38 features a hollow interior to facilitate routing power and gas to the electrical conductor 36 and to provide an air space in which a vacuum region may be created to thermally insulate the handle 38. Other components of the welding torch 16 that are coupled to the torch head 40 may include an insulator 41, a nozzle 43, a collet (not shown), the electrical conductor 36, and a back cap 45. The insulator 41 may be positioned on the interior of the torch head 40 to block heat produced by the welding current from passing into the torch body and/or the handle 38. The nozzle 43, which may be attached to the insulator 41 or the torch head 40, includes a hollow tubular shaped piece that encloses the collet and the electrical conductor 36, providing a path for the shielding gas to pass between an interior surface of the nozzle 43 and the collet. The back cap 45 screws into the torch head 40 to secure the collet and the electrical conductor 36. Back caps 45 of different lengths and nozzles 43 of different sizes may be interchangeable with the same torch body, allowing an operator to use the same torch body in a variety of TIG welding applications. A cable assembly 47 coupled to the torch body conveys both electrical power and shielding gas to the torch head 40 from the power supply conduit 18 and the gas conduit 30. The handle 38 may be coupled to the cable assembly 47 with a plug 49, creating a seal over the handle 38.

Figure 3:
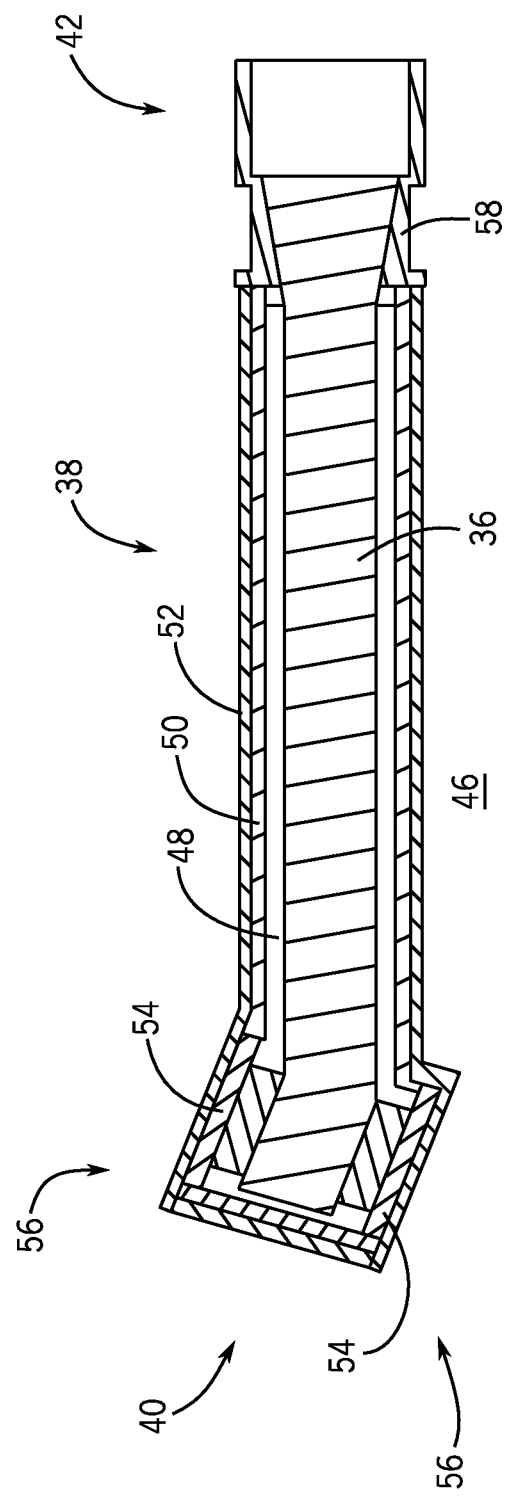
FIG. 3 is a cross-sectional side view of a welding torch having a vacuum insulated handle.

FIG. 3 is a cross-sectional side view of the torch 16, including the vacuum insulated torch handle 38. The torch 16 includes the torch head 40 and a torch base 42, which may in certain embodiments be integrated directly into the torch handle 38. In the illustrated embodiment, the electrical conductor 36 (e.g., an electrically conductive inner body) extends through a center of the torch 16. In other words, the electrical conductor 36 extends through the torch base 42, the torch handle 38, and the torch head 40 to facilitate current conduction from the power supply conduit 18 to the work piece 20. In particular, the current may be conducted from the torch head 40 to a tungsten insert of the torch 16. It should be noted that the embodiment illustrated in FIG. 3 is simplified to focus on the insulated torch handle 38.

As will be appreciated, transfer of current through the torch 16 by the electrical conductor 36 (e.g., to a tungsten insert of the torch 16) may generate elevated temperatures within the handle 38. That is, when an arc is created between the torch 16 and the work piece 20, heat is generated throughout the electrical conductor 36 by the electric current flowing through the electrical conductor 36. To reduce heat transfer from the electrical conductor 36 to an exterior 46 of the handle 38 of the torch 16, the vacuum insulated torch handle 38 includes a sealed vacuum region 48 (e.g., cavity, annular volume, inner volume, etc.) disposed about the electrical conductor 36 within the torch handle 38 and the torch head 40. In certain embodiments, however, the vacuum sealed region 48 may be disposed only within the torch handle 38. That is, the vacuum sealed region 48 may not extend into the torch head 40. For example, the torch handle 38 having the vacuum sealed region 48 may be retrofitted for use with an existing torch 16.

The vacuum sealed region 48 functions to reduce heat transfer from the electrical conductor 36 to an outer material layer 50 (e.g., an electrically and/or thermally insulative layer) disposed about the vacuum sealed region 48. For example, the sealed vacuum region 48 may have a pressure of approximately 0.0001 to 10, 0.0002 to 8, 0.0003 to 6, 0.0004 to 4, 0.0005 to 2, or 0.001 to 1 pascals. The outer material layer 50 disposed about the vacuum sealed region 48 may be a low thermally and/or low electrically conductive material, such as a plastic, ceramic, composite, a metal, such as stainless steel, or other suitable material. In certain embodiments, the torch 16 may further include an outer overmolded layer 52, which may be formed from rubber or other material molded or otherwise disposed over the outer material layer 50 and may further reduce heat transfer from the electrical conductor 36 to an operator using the torch 16. For example, the outer material layer 50 and the outer overmolded layer 52 may be disposed directly adjacent to one another. However, in other embodiments, the torch 16 may not include the outer overmolded layer 52.

The torch 16 may be manufactured using a variety of different methods. That is, different processes may be used to create the sealed vacuum region 48 within the vacuum insulated torch handle 38. For example, a vacuum brazing process or technique, such as oven vacuum brazing, may be used to create the sealed vacuum region 48 between the electrical conductor 36 and the outer material layer 50.

Specifically, the torch 16 may be formed by positioning the outer material layer 50 about the electrical conductor 36 within an oven or furnace that provides a vacuum environment. In other words, the oven or furnace may not have air within, or the environment within the oven or furnace may be less than normal atmospheric pressure. For example, the pressure within the vacuum environment may be approximately 0.0001 to 10, 0.0002 to 8, 0.0003 to 6, 0.0004 to 4, 0.0005 to 2, or 0.001 to 1 pascals. Inside the oven or furnace, the outer material layer 50 may then be brazed in place about the electrical conductor 36. For example, in the illustrated embodiment, two braze rings 54 are positioned and brazed to the outer material layer and/or the electrical conductor 36 at ends 56 of the torch head 40. Additionally, the outer material layer 50 may be brazed to a base adapter 58 at the torch base 42 of the torch 16. In certain embodiments, the torch 16 may also include one or more braze rings 54 positioned and brazed to the outer material layer 50, the electrical conductor 36, and/or the base adapter 58 at the torch base 42 of the torch 16. In this way, the vacuum sealed region 48 may be created and sealed by the connections between the braze rings 54, the outer material layer 50, and the base adapter 58. After the brazing is completed, the torch 16 may be removed from the oven or furnace. In certain embodiments, the outer overmolded layer 52 may then be applied to the outer material layer 50 of the torch 16. For example, the outer overmolded layer 52 may be molded, wrapped, or otherwise adhered to the outer material layer 50.

As will be appreciated, the use of a vacuum brazing technique to produce the torch handle 38 may yield benefits and advantages over existing techniques. For example, vacuum brazing may enable the creation of high quality (e.g., high strength and/or high integrity) and clean braze joints. As a result, the torch 16 and the vacuum sealed region 48 within the handle 38 may be produced with high quality (e.g., capable of sustaining the vacuum sealing for a long time), thereby prolonging the useful life of the torch 16. Additionally, the vacuum brazing technique may enable a reduction in costs (e.g., manufacturing and labor costs) associated with the production of the torch 16.

Additionally, it will be appreciated that the vacuum sealed region 48 disposed about the electrical conductor 36 may insulate the heat generated through the electrical conductor 36 more effectively than traditional torch cooling methods, such as air cooling or liquid cooling methods. In other words, the vacuum sealed region 48 may reduce conduction and/or convection of heat from the electrical conductor 36 to the handle 38. As a result, the torch 16 may be manufactured more compactly and/or ergonomically. For example, in certain embodiments, the torch 16 may have a smaller electrical conductor 36 that passes a higher current, while the vacuum sealed region 48 sufficiently insulates the heat generated within the electrical conductor 36. The use of a smaller electrical conductor 36 with a higher current flow enables the production of smaller torches 16, which improves the ergonomics and usability of the torch 16, while still enabling the generation of sufficiently high welding currents.

Figure 4:
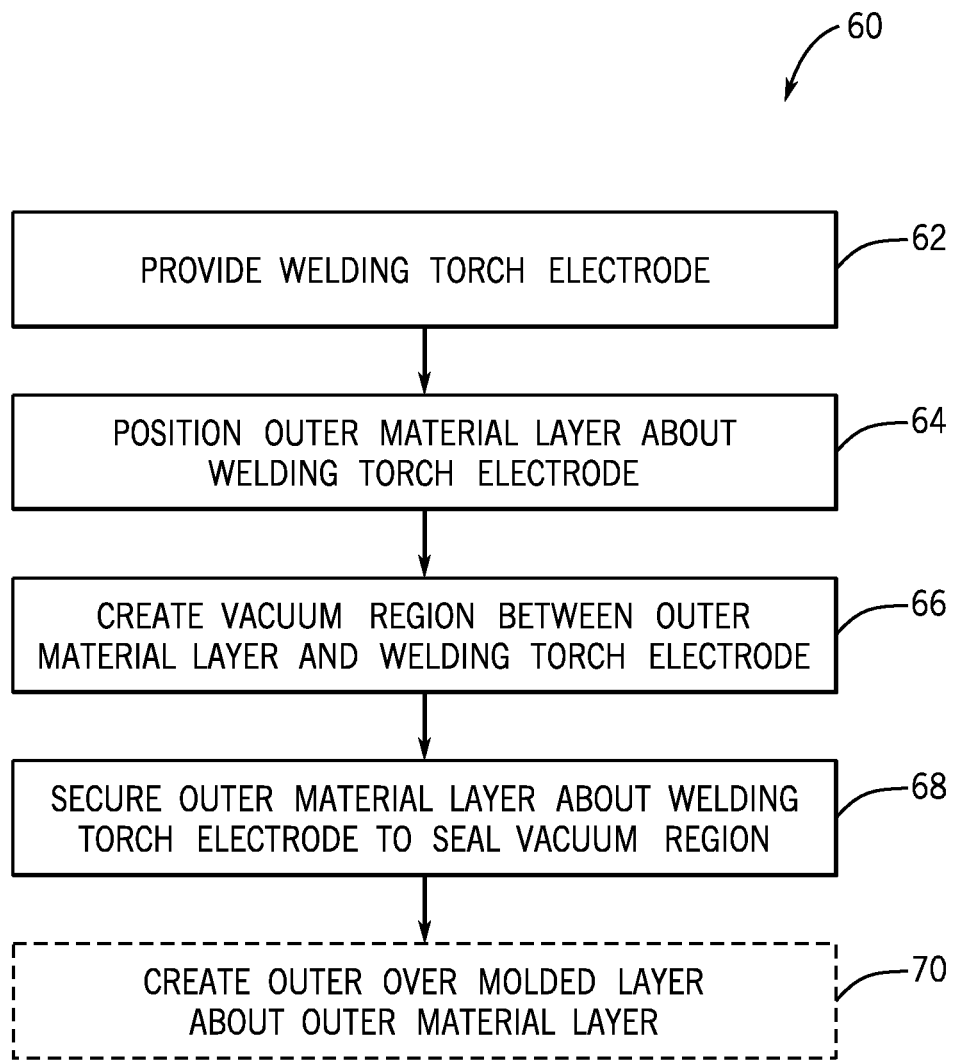
FIG. 4 is a process flow diagram of a method of manufacturing a welding torch having a vacuum insulated handle.

FIG. 4 is a process flow diagram of a method 60 for manufacturing or producing the torch 16 having the vacuum insulated torch handle 38. A first step, as indicated by block 62, may be to provide the welding torch electrical conductor 36. As discussed above, the electrical conductor 36 is configured to transfer current from the power supply conduit 18, and therefore from the power supply 12, to the work piece 20. That is, the electrical conductor 36 is used to facilitate the creation of the welding arc 44 between the torch 16 and the work piece 20 for a welding operation. In certain embodiments, the electrical conductor 36 may be formed from oxygen-free copper. Next, the outer material layer 50 is positioned (e.g., radially) about the welding torch electrical conductor 36, as indicated by block 64. As will be appreciated, the outer material layer 50 may have a similar geometry as the electrical conductor 36 to substantially encase the electrical conductor 36, while still providing a gap, space, or annulus (i.e., which becomes the vacuum sealed region 48) between the electrical conductor 36 and the outer material layer 50. The outer material layer 50 may be formed from any suitable material, such as a thermally and/or electrically insulating material. For example, the outer material layer 50 may be formed from a ceramic, plastic, polymer, or other material.

After the outer material layer 50 is positioned about the electrical conductor 36, a vacuum region may be created between the outer material layer 50 and the electrical conductor 36, as indicated by block 66. For example, the electrical conductor 36 and the outer material layer 50 may be placed in an environment having less than atmospheric pressure, such as a vacuum oven or furnace. Once the vacuum region is created, the vacuum region may be sealed to create the vacuum sealed region 48. As indicated by block 68, the outer material layer 50 may be secured about the electrical conductor 36 to seal the vacuum region and create the sealed vacuum region 48. As described above, the outer material layer 50 may be secured about the electrical conductor 36 using a brazing process (e.g., a vacuum brazing process within an oven or furnace). The brazing process may include brazing braze rings 54 to the outer material layer 50 and brazing the outer material layer 50 to the base adapter 58 of the torch 16. In this manner, the annulus or gap between the electrical conductor 36 and the outer material layer 50 may be sealed while maintaining a vacuum within the annulus or gap.

After the sealed vacuum region 48 is created, the torch handle 38 may be removed from the vacuum environment (e.g., removed from the vacuum oven or furnace). In certain embodiments, one or more additional material layers may then be applied to the torch handle 38. For example, as indicated by block 70, the outer overmolded layer 52 may be added to the torch handle 38 (e.g., disposed about the outer material layer 50) to provide an additional insulated layer. For example, the outer overmolded layer 52 may be formed from a plastic, rubber, polymer, or other material. However, in other embodiments, the outer overmolded layer 52 may not be included.

As will be appreciated, the steps of the method 60 shown in FIG. 4 may be executed in different orders. For example, in the illustrated embodiment, the outer material layer 50 is positioned about the electrical conductor 36, as indicated by block 64, before the vacuum region is created between the outer material layer 50 and the electrical conductor 36, as indicated by block 66. In other words, the outer material layer 50 is positioned about the electrical conductor 36 before the electrical conductor 36 and outer material layer 50 are placed in a vacuum environment, such as a vacuum oven or furnace. However, in other embodiments, the steps of blocks 64 and 66 may be reversed. That is, the electrical conductor 36 may be placed within a vacuum environment, such as a vacuum oven or furnace, and the outer material layer 50 may subsequently be placed within the vacuum environment and positioned about the electrical conductor 36.

As discussed above, present embodiments are directed toward the welding torch 16 having the vacuum insulated handle 38. The welding torch 16 includes the electrical conductor 36 configured to flow a welding (e.g., electrical) current, the sealed vacuum region 48 about the electrical conductor 36, and the outer material layer 50 disposed about the vacuum sealed region 48. The sealed vacuum region 48 functions as an insulating region about the electrical conductor 36, thereby reducing heat transfer from the electrical conductor 36 to the outer material layer 50, and ultimately to an operator's hand or equipment, during a welding operation. As discussed above, the sealed vacuum region 48 about the electrical conductor 36 enables a reduction in the size and/or bulk of other insulating material layers disposed about the electrical conductor 36, while still achieving a desired reduction in heat transfer from the electrical conductor 36 to an exterior (e.g., of the torch handle 38) of the welding torch 16. As a result, the welding torch 16 may be smaller, lighter, and more maneuverable for a user or operator. Additionally, the increased heat retention and/or insulation of the vacuum insulated torch handle 38 enables larger currents (e.g., generating higher welding temperatures) to be used with smaller electrical conductors 36, thereby further enabling a reduction in the size of the torch 16 and improving the quality of welds and brazes produced with the torch 16.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding torch, comprising:
a torch head;
a base adapter at a base of the welding torch;
a gas tungsten arc welding (GTAW) electrode;
an electrical conductor configured to conduct a welding current to the GTAW electrode via the torch head, the welding current generating a heat when conducted through the electrical conductor;
an outer material layer disposed about at least a portion of the electrical conductor, the outer material layer being electrically or thermally insulating; and
a sealed vacuum region disposed between the electrical conductor and the outer material layer, the sealed vacuum region defined by the electrical conductor, the outer material layer, a first braze coupling the electrical conductor and a braze ring at the torch head, a second braze coupling the outer material layer and the braze ring at the torch head, and a third braze between the outer material layer and the base adapter, the sealed vacuum region being configured to reduce transfer of the heat from the electrical conductor to the outer material layer.

2. The welding torch of claim 1, comprising an outer overmolded layer disposed about the outer material layer.

3. The welding torch of claim 2, wherein the outer overmolded layer comprises rubber, plastic, or some other polymer.

4. The welding torch of claim 1, wherein the outer material layer comprises a ceramic.

5. The welding torch of claim 1, wherein the base adapter has an opening configured to receive a welding cable.

6. The welding torch of claim 1, wherein the sealed vacuum region extends along an entire length of the welding torch.

7. A welding torch, comprising:
a gas tungsten arc welding (GTAW) electrode;
a torch head; and
a torch handle, comprising:
an electrical conductor configured to conduct a welding current to the GTAW electrode via the torch head, the welding current generating a heat when conducted through the electrical conductor,
an outer material layer disposed about the electrical conductor, the outer material layer being electrically and thermally insulating,
a base adapter at a base of the welding torch,
a sealed vacuum region disposed between the electrical conductor and the outer material layer, the sealed vacuum region defined by the electrical conductor, the outer material layer, and a first braze coupling the electrical conductor and a braze ring in the torch head, a second braze coupling the outer material layer and the braze ring at the torch head, and a third braze between the outer material layer and the base adapter, the sealed vacuum region being configured to reduce transfer of the heat from the electrical conductor to the outer material layer or an end user, and
an overmolded outer layer disposed about the outer material layer.

8. The welding torch of claim 7, wherein the outer material layer comprises a ceramic, and the overmolded outer layer comprises a rubber, a plastic, or some other polymer.

9. The welding torch of claim 7, wherein the sealed vacuum region extends from a base of the torch handle to the torch head.

10. The welding torch of claim 7, wherein the base adapter comprises an opening configured to receive a welding cable, the electrical conductor defining a portion of the opening and extending from the opening to the torch head.

11. The welding torch of claim 7, wherein the torch head is configured to receive a back cap.

12. The welding torch of claim 1, wherein the torch head is configured to receive a back cap.

13. The welding torch of claim 1, wherein the electrical conductor is configured to conduct the welding current from a torch handle to the torch head.

14. The welding torch of claim 1, wherein the electrical conductor is configured to conduct the welding current from the base adapter, through a torch handle, to the torch head.

* * * * *